United States Patent [19]

Nakanishi et al.

[11] Patent Number: 4,618,189

[45] Date of Patent: Oct. 21, 1986

[54] VEHICLE HYDRAULIC BRAKING SYSTEM WITH ANTI-SKID PRESSURE CONTROL MEANS

[75] Inventors: Nobuyasu Nakanishi; Yoshihisa Nomura, both of Toyota, Japan

[73] Assignee: Toyota Jidosha Kabushiki Kaisha, Toyota, Japan

[21] Appl. No.: 764,226

[22] Filed: Aug. 9, 1985

[30] Foreign Application Priority Data

Aug. 15, 1984 [JP] Japan ................................ 59-170724

[51] Int. Cl.$^4$ ............................................... B60T 8/08
[52] U.S. Cl. ..................................... 303/116; 303/119
[58] Field of Search ................. 303/93, 110, 113, 116, 303/119

[56] References Cited

U.S. PATENT DOCUMENTS 4,395,073 7/1983 Arikawa et al. ..................... 303/116

FOREIGN PATENT DOCUMENTS

56-142733 7/1981 Japan .

Primary Examiner—Duane A. Reger
Attorney, Agent, or Firm—Kenyon & Kenyon

[57] ABSTRACT

A hydraulic braking system having a master cylinder, a brake cylinder, a primary passage connecting the master and brake cylinder, a solenoid valve for selective communication of the brake cylinder with the master cylinder or with a reservoir, a pump for returning a brake fluid to the master cylinder, a shut-off valve disposed in the primary passage to prevent a flow of the fluid from the pump toward the master cylinder when the pump side pressure is higher than the master cylinder side pressure, an accumulator having a piston movable to define a variable volume chamber for storing the fluid under pressure, the braking system comprising a check valve in the primary passage between the master cylinder and the shut-off valve to inhibit a fluid flow therethrough in one direction from the master cylinder toward the shut-off valve, and further comprising a mechanism disposed between the accumulator and the check valve to hold a valve member of the check valve away from its seat to allow the fluid flow in the above-identified one direction while the accumulator piston is in its advanced position in which the volume of the accumulator chamber is minimum, the mechanism permitting the check valve member to be seated on the seat after the accumulator piston has been moved away from the advanced position.

7 Claims, 1 Drawing Figure

VEHICLE HYDRAULIC BRAKING SYSTEM WITH ANTI-SKID PRESSURE CONTROL MEANS

BACKGROUND OF THE INVENTION

1. Field of the Art

The present invention relates in general to a hydraulic braking device or system for an automotive vehicle, and more particularly to such a hydraulic braking system having anti-skid pressure control means for controlling the braking pressure in wheel brake cylinders in order to prevent an excessive slip of the vehicle wheels on the road surface upon brake application.

2. Related Art Statement

An example of such a hydraulic braking system for an automotive vehicle is known, according to Japanese Patent Application laid open in 1981 under Publication No. 56-142733, which comprises: (a) a master cylinder for generating a fluid pressure in response to an operation of a manually-operated member; (b) a brake having a brake cylinder actuated by the fluid pressure generated by the master cylinder, for restraining the rotation of a drive wheel of the vehicle; (c) a primary fluid passage connecting the master cylinder and the brake cylinder to feed a brake fluid from the master cylinder to the brake cylinder; (d) a solenoid valve disposed in the primary fluid passage and selectively placed in one of a first operating position for communication of the brake cylinder with the master cylinder, and a second operating position for communication of the brake cylinder with a reservoir, the solenoid valve being switched between the first and second operating positions under the control of a controller, to control a level of a braking pressure in the brake cylinder for preventing an excessive amount of slip of the drive wheel on the road surface upon brake application; (e) a pump for pumping the brake fluid from the reservoir and returning the pumped fluid via a pump passage to the primary fluid passage at a point thereof between the master cylinder and the solenoid valve; (f) a check valve disposed in a portion of the primary fluid passage between the master cylinder and the above-identified point, the check valve being closed to prevent a flow of the brake fluid therethrough in a direction from the pump toward the master cylinder when the pressure on one side of the check valve on the side of the pump is higher than that on the other side on the side of the master cylinder, whereby the check valve serves as a shut-off valve for the master cylinder; and (g) an accumulator disposed in a fluid passage connecting the pump and the solenoid valve, the accumulator having a housing, a piston slidably received in the housing, and biasing means for biasing the piston axially in one direction, the piston cooperating with the housing to define a storage chamber of a variable volume in which the brake fluid is stored under a relatively high pressure.

The hydraulic braking system with anti-skid pressure control means constructed as described above, prevents a so-called "kick-back" phenomenon of a brake pedal or other manually-operated member, which is conventionally encountered due to a return flow of the brake fluid from the pump to the primary fluid passage, and then into the master cylinder. The elimination of the "kick-back" phenomenon leads to an improved operating feel of the brake pedal.

PROBLEM SOLVED BY THE INVENTION

In the hydraulic braking system of the type indicated above, however, a "kick-back" phenomenon will occur under the following condition. The shut-off valve (check valve) for the master cylinder is opened if the pressure on one side of the shut-off valve on the side of the pump becomes lower than the pressure on the other side on the side of the master cylinder while the shut-off valve is in the closed position to block a flow of the brake fluid from the pump toward the master cylinder. When the pressure on the side of the pump subsequently becomes higher than that on the side of the master cylinder, it takes a certain length of time for the shut-off valve to be closed. During this time, the brake fluid will flow back into the master cylinder, causing the "kick-back" phenomenon. To prevent this phenomenon, provisions should be made to assure that the pressure on the side of the pump be always higher than that on the side of the master cylinder.

To this end, it is required that the accumulator store the brake fluid under a pressure which is higher than a maximum pressure level of the brake fluid which is expected on the side of the master cylinder. This means that the braking system should use an accumulator with a relatively high strength to pressure, and a pump and a pump motor of a relatively large capacity for pressurizing the brake fluid to a higher level with respect to the master cylinder pressure. Accordingly, the anti-skid pressure control means of the braking system tends to be heavy and expensive.

SUMMARY OF THE INVENTION

It is accordingly an object of the present invention to provide a hydraulic braking system with anti-skid pressure control means for an automotive vehicle, which is substantially free from a "kick-back" phenomenon of a brake pedal or other manually-operated brake control member of the vehicle, and wherein the anti-skid pressure control means is relatively lightweight and economical to manufacture.

Another object of the invention is to provide such a hydraulic braking system having a shut-off valve which is capable of preventing the "kick-back" phenomenon, even when the braking system uses a pump of a relatively small discharge capacity.

According to the present invention, there is provided a hydraulic braking system with anti-skid pressure control means for applying a brake to a drive wheel of an automotive vehicle, having (a) a master cylinder for generating a fluid pressure in response to an operation of a manually-operated member, (b) a brake having a brake cylinder actuated by the fluid pressure generated by the master cylinder, for restraining the rotation of a drive wheel of the vehicle, (c) a primary fluid passage connecting the master cylinder and the brake cylinder to feed a brake fluid from the master cylinder to the brake cylinder, (d) a solenoid valve disposed in the primary fluid passage and selectively placed in one of a first operating position for communication of the brake cylinder with the master cylinder, and a second operating position for communication of the brake cylinder with a reservoir, the solenoid valve being switched between the first and second operating positions under the control of a controller, to control a level of a braking pressure in the brake cylinder for preventing an excessive amount of slip of the drive wheel, (e) a pump for pumping the brake fluid from the reservoir and returning the pumped fluid via a pump passage to the primary fluid passage at a point thereof between the master cylinder and the solenoid valve, (f) a shut-off valve disposed in a portion of the primary fluid passage between the master cylinder and the above-identified point, the shut-off valve being closed to prevent a flow of the brake fluid therethrough in a direction from the pump toward the master cylinder when the pressure on one side of the shut-off valve on the side of the pump is higher than that on the other side on the side of the master cylinder, and (g) an accumulator disposed in a fluid passage connecting the pump and the solenoid valve, the accumulator having an accumulator housing, an accumulator piston slidably received in the accumulator housing, and biasing means for biasing the accumulator piston in one axial direction thereof, the accumulator piston cooperating with the accumulator housing to define a storage chamber of a variable volume in which the brake fluid is stored under a relatively high pressure, wherein the improvement comprises: a check valve disposed in a portion of the primary fluid passage between the master cylinder and the shut-off valve, and adjacent to the accumulator, the check valve inhibiting a flow of the brake fluid therethrough in a first direction from the shut-off valve toward the master cylinder and allowing a flow of the brake fluid therethrough in a second direction opposite to said first direction, the check valve including a check valve seat and a check valve member adapted to be seated on the check valve seat; and a valve-control mechanism disposed between the accumulator and the check valve for controlling the check valve, the valve-control mechanism holding the check valve member away from the check valve seat to allow the brake fluid to flow in said first direction while the accumulator piston is placed in its fully advanced position in which the volume of the storage chamber is minimum, the valve-control mechanism permitting the check valve member to be seated on the check valve seat after the accumulator has been retracted a small distance away from the fully advanced position.

In the hydraulic braking system constructed according to the invention as described above, the piston of the accumulator is placed in its fully advanced position while the anti-skid pressure control function is not in effect. That is, the valve member of the check valve disposed between the master cylinder and the shut-off valve is held in its open position by the valve-control mechanism which is disposed between the accumular and the check valve. In this condition, the brake fluid may be fed from the master cylinder to the brake cylinder.

When the anti-skid pressure control function of the braking system is started, the check valve is closed after a small amount of the brake fluid is stored in the variable-volume storage chamber of the accumular, whereby the check valve blocks the fluid pressure in the master cylinder from being applied to the shut-off valve. Accordingly, the shut-off valve will not be opened even if the fluid pressure in the master cylinder becomes higher than that in the accumulator.

As is apparent from the foregoing description, the hydraulic braking system of the invention is characterized in that a check valve is provided to block a flow of the brake fluid in a direction from the master cylinder toward the shut-off valve, and that this check valve is normally held in its open position by means of the accumulator piston. This is contrary to the conventional arrangement as previously indicated, wherein a check valve is used to block a flow of the brake fluid from the shut-off valve toward the master cylinder. Namely, the direction of the fluid flow inhibited by the check valve of the instant braking system according to the invention is opposite to that of the check valve used in the known braking system.

In the instant braking system, the pressure of the brake fluid to be stored in the accumulator may be preset comparatively low, because the shut-off valve will not be opened even in the event that the master cylinder pressure would become higher than the accumulator pressure as previously explained. Described in greater detail, the fluid pressure in the accumulator that is required to control the pressure in the brake cylinder so as to hold a slip of the drive wheel within an optimum range, is substantially always considerably lower than the heighest fluid pressure to be developed by the master cylinder. Hence, it is possible to preset the accumulator pressure at such considerably lower pressure with respect the master cylinder pressure. Accordingly, the housing and the biasing means of the accumulator may be made smaller in size, and the pump and its drive motor may also be small-sized according to reduction in the preset pressure of the accumulator.

Further, the piston of the accumulator is adapted to be moved to its fully advanced position when it becomes necessary for the master cylinder to feed the brake fluid to the brake cylinder, for example when the amount of slip of the drive wheel is reduced due to an increase in the coefficient of friction of the road surface after the anti-skid pressure control function has been brought into play. In the fully advanced position of the accumulator piston, the valve-control mechanism between the accumulator and the check valve holds the check valve open, allowing the brake fluid to flow from the master cylinder into the brake cylinder. Thus, the provision of the check valve between the master cylinder and the shut-off valve will not give an adverse effect on the anti-skid pressure control capability of the braking system.

According to one advantageous embodiment of the invention, the valve-control mechanism is a rod which is supported by the accumulator housing movably in a direction of movement of the piston of the accumulator, and in fluid-tight relation with the accumulator housing. The rod is abuttable at its one end on the piston of the accumulator, and at the other end on the valve member of the check valve. Thus, the valve-control mechanism is provided in the form of a simple elongate member disposed between the accumulator piston and the valve member of the check valve.

In one form of the above embodiment, the accumulator and said check valve are provided in a single common housing having a partition wall which separates the storage chamber of the accumulator from a valve chamber in which the check valve member is accommodated. The rod to control the check valve extends through this partition wall so as to be abuttable on the accumulator piston and the check valve member.

In accordance with another advantageous embodiment of the invention, the shut-off valve comprises: means for defining a shut-off valve chamber formed at a connection of said pump passage and said primary fluid passage; a shut-off valve seat which partially defines the shut-off valve chamber, and through which the brake fluid from the master cylinder is fed into the shut-off valve chamber; a shut-off valve member accommodated in the shut-off valve chamber such that the shut-off valve member may be seated on and moved away from the shut-off valve seat; biasing means for biasing the shut-off valve member in a direction away from the shut-off valve seat; means for defining a shut-off piston chamber constituting a part of said pump passage; a shut-off valve piston slidably received in the shut-off piston chamber so as to define a first and a second pressure chamber on opposite axial ends thereof, the first pressure chamber being connected to the pump passage while the second pressure chamber being open in the shut-off valve chamber, the shut-off valve piston normally permitting the shut-off valve member to be placed away from the shut-off valve seat; and means for defining a restrictor passage communicating with the first and second pressure chambers.

The restrictor passage allows the brake fluid to flow from the first pressure chamber to the second pressure chamber when the pump is actuated to feed the brake fluid to the first pressure chamber. The restrictor passage gives a restriction to a flow of the fluid therethrough toward the second pressure chamber and thereby generates a pressure differential between the first and second pressure chambers. The pressure differential causes the shut-off valve piston to move toward the second pressure chamber and thereby seat the shut-off valve member on the shut-off valve seat. In one preferred form of the above-constructed shut-off valve, the restrictor passage is formed through the shut-off valve piston.

In the shut-off valve constructed as described above, the shut-off valve member is seated on the valve seat by a flow of the brake fluid which is forced out by the pump, and held seated on the valve seat by the flow of the fluid from the pump. With the instant arrangement, the shut-off valve member blocks a flow of the brake fluid into the master cylinder, and consequently prevents the "kick-back" phenomenon of the manually-operated member, even if the pressure of the brake fluid from the pump is temporarily lowered for some reason or other and subsequently raised. It is noted that the pressure of the fluid from the pump is lowered, for example immediately after the solenoid valve has been moved to its first operating position to allow the brake fluid to flow from the master cylinder to the brake cylinder, or when a large amount of the brake fluid is fed into the brake cylinder, if the discharge capacity of the pump is not sufficiently large. The instant shut-off valve eliminates the conventionally experienced "kickback" inconvenience on such occassions, even with the pump having a relatively small discharge capacity. Accordingly, the instant shut-off valve contributes to reduction in weight, size and cost of the braking system as a whole.

According to another aspect of the invention, there is provided a shut-off valve in an anti-skid pressure control device of a hydraulic braking system for an automotive vehicle, the anti-skid pressure control device including a solenoid valve disposed in a primary fluid passage of the braking system which connects a master cylinder and a brake cylinder to feed a brake fluid from the master cylinder to the brake cylinder to apply a brake to a drive wheel of the vehicle, the solenoid valve being selectively placed in one of a first position for communication of the brake cylinder with the master cylinder, and a second position for communication of the brake cylinder with a reservoir, the solenoid valve being switched between the first and second positions under the control of a controller to control a level of a braking pressure in the brake cylinder for preventing an excessive amount of slip of the drive wheel, the anti-skid pressure control device further including a pump for pumping the brake fluid from the reservoir and returning the pumped fluid via a pump passage to a portion of the primary fluid passage between the master cylinder and the solenoid valve, wherein the shut-off valve is disposed at a connection of the pump passage and the primary fluid passage, the shut-off valve normally maintaining fluid communication between portions of the primary fluid passage on both sides of the connection, the shut-off valve being closed to prevent a flow of the brake fluid therethrough in a direction from the pump toward the master cylinder while the brake fluid is fed via the pump passage to the shut-off valve, the shut-off valve comprising: the relief valve comprises: (1) a relief valve housing having a relief valve chamber, a first port communicating with the relief valve chamber and a pump passage connected the pump, and a second port communicating with the relief valve chamber and the master cylinder; (2) a relief valve seat formed so as to define a part of the relief valve chamber adjacent to the first port; (3) a relief valve member accommodated in the relief valve chamber such that the relief valve member may be seated on the relief valve seat; (4) a relief valve piston slidably and fluid-tightly supported in the relief valve housing, such that an axis of the relief valve piston is aligned with and opposite to the relief valve seat, with the relief valve member disposed therebetween, the relief valve piston receiving at one end thereof a pressure in the relief valve chamber, and at the other end an atmospheric pressure; and (5) biasing means for biasing the relief valve member toward said relief valve seat.

BRIEF DESCRIPTION OF THE DRAWING

The foregoing and other objects, features and advantages of the present invention will be better understood from reading the following detailed description of a preferred embodiment of the invention, when considered in connection with the accompanying drawing, in which the single FIGURE is a fragmentary schematic circuit diagram of one embodiment of a hydraulic braking device or system of the invention for a four-wheel automotive vehicle, illustrating also major components of the system in cross section.

DETAILED DESCRIPTION OF THE PREFERRED EMBODIMENT

Figure 1:
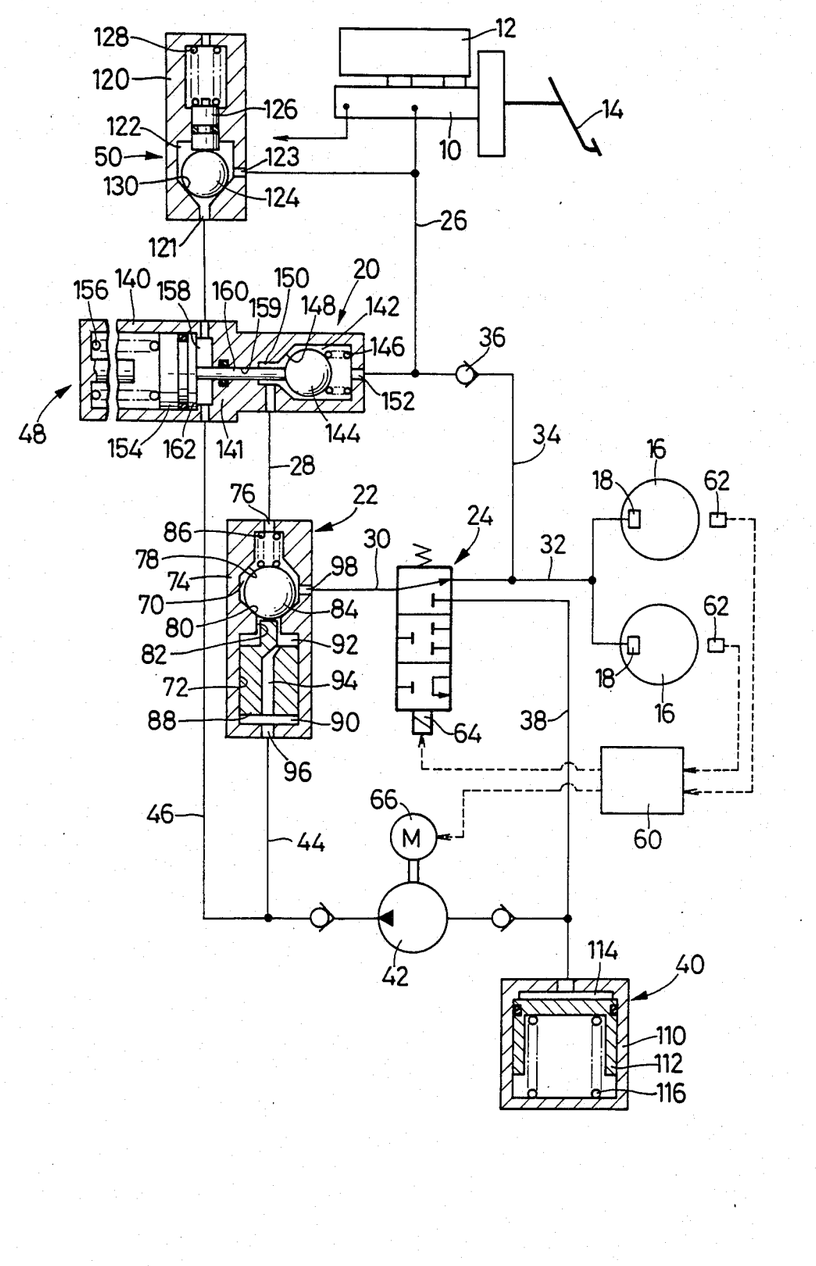

A preferred embodiment of the invention in the form of a hydraulic braking system or device for a four-wheel car will be described in greater detail, by reference to the drawing.

In the FIGURE, reference numeral 10 designates a master cylinder which is fed with a brake fluid supplied from a reservoir 12. The master cylinder 10 has two mutually independent pressure chambers in which pressures of the same level are generated upon depression of a brake pedal 14 provided as a manually-operated member for applying a brake to the car. The braking pressure developed in one of the two pressure chambers in the master cylinder 10 is applied to brake cylinders 18 of wheel brakes of drum, disc or other types provided for right and left rear drive wheels 16 of the car. In the meantime, the braking pressure in the other pressure chamber of the master cylinder 10 is applied to brake cylinders (not shown) for front drive wheels (not shown) of the car. The front braking system for the front drive wheels is identical to the rear braking system for the rear drive wheels 16, with the exception that the braking pressures to be applied to the front brake cylinders are controlled independently of each other. In the interest of brevity and simplification, only the rear braking system will be described.

The master cylinder 10 is connected to the brake cylinders 18 through a primary fluid passage in which there are disposed a check valve 20, a selector valve 22 and a solenoid valve 24. These three valves 20, 22, 24 divide the primary fluid passage into four parts: a first passage 26 communicating with the master cylinder 20 and the check valve 20; a second passage 28 (an intermediate passage) communicating with the check valve 20 and the selector valve 22; a third passage 30 (another intermediate passage) communicating with the selector valve 22 and the solenoid valve 24; and a fourth passage 32 communicating with the solenoid valve 24 and the brake cylinders 18. The first and fourth passages 26, 32 are connected by a by-pass passage 34 in which is provided a check valve 36 which allows a fluid flow only in one direction from the fourth passage 32 toward the first passage 26.

The solenoid valve 24 is connected to a reservoir 40 through a reservoir passage 38. The brake fluid reserved in this reservoir 40 is pumped out by a pump 42, and delivered to the previously indicated selector valve 22 through a pump passage 44. In short, the selector valve 22 is disposed in a line through which the brake fluid is returned from the pump passage 44 to the primary passage.

The pump passage 44 is connected to the first passage 26 through a by-pass passage 46 in which an accumulator 48 and a relief valve 50 are provided.

While the hydraulic braking device or system has been outlined, the construction and operation of the individual components will be described.

The solenoid valve 24 is selectively placed in one of first, second and third operating positions which are referred to as "PRESSURE RISE", "PRESSURE HOLD" and "PRESSURE DROP" positions. In the first or PRESSURE RISE position, the third passage 30 is held in communication with the fourth passage 32, as shown in the FIGURE. Thus, the solenoid valve 24 in the PRESSURE RISE position permits the braking pressure in the brake cylinders 18 to rise with the brake fluid delivered to the third passage 30 from the master cylinder 10 or the pump 42. In the second or PRESSURE HOLD position, all of the third, fourth and reservoir passages 30, 32, 38 are shut by the solenoid valve 24, whereby the braking pressure in the brake cylinders 18 is maintained at a fixed level. In the third or PRESSURE DROP position, the fourth passage 32 is held in communication with the reservoir passage 38. Thus, the solenoid valve 24 in its PRESSURE DROP position permits the braking pressure in the brake cylinders 18 to drop or fall with the brake fluid discharged from the brake cylinders 18 to the reservoir 40.

The solenoid valve 24 is operated under the control of the controller 60 a substantive part of which is a microcomputer. The controller 60 receives SPEED signals from speed sensors 62 which sense rotating speeds of the rear drive wheels 16. Based on the SPEED signals, the controller 60 determines a degree of slip of the rear drive wheels 16 on the road surace, and controls an electric current to be applied to the solenoid valve 24, depending upon the determined degree of slip of the wheels 16. In this manner, the solenoid valve 24 is placed selectively in one of its three operating positions previously discussed. Since this manner of controlling a solenoid valve is known in the art, and since the manner of controlling the solenoid valve 24 by the controller 60 is not important for understanding the concept of the present invention, no further description will be provided herein in this connection.

The controller 60 is adapted to also control a pump motor 66 which drives the pump 42. Described more specifically, the pump motor 66 is controlled by the controller 60 so as to start a pumping action of the pump 42 when an anti-skid control of the braking pressure in the brake cylinders 18 is started. That is, the pump motor 66 is started when the solenoid valve 24 is shifted from its PRESSURE RISE position to its PRESSURE HOLD or PRESSURE DROP position, for the first time. The pump 42 is held operated by the motor 66 as long as the anti-skid control of the braking pressure continues.

The selector valve 22 is selectively placed in one of two operating postions: a first position in which the second passage 28 is held in communication with the third passage 30; and a second position in which the pump passage 44 is in communication with the third passage 30. To this end, a housing 74 of the selector valve 22 is formed with a valve chamber 70 and a piston chamber 72. The second passage 28 communicates with the valve chamber 70 through a port 76. On one open end of the port 76 on the side of the valve chamber 70, there is formed a first valve seat 78. The housing 74 is formed with a second valve seat 80 which is concentric with and opposed to the first valve seat 78. The valve chamber 70 communicates with the piston chamber 72 through a communication hole 82 which is open at its one end in a central portion of the second valve seat 80. A spherical valve member 84 is accommodated in the valve chamber 70. The valve member 84 is normally forced by a spring 86 against the second valve seat 80, thereby closing the communication hole 82. The piston chamber 72 is formed adjacent to the valve chamber 70 in concentric relation with each other. Within the piston chamber 70, there is slidably received a piston 88 in a substantially fluid-tight condition with respect to the inner surface of the piston chamber 70. The piston 88 divides the piston chamber 72 into a first chamber 90 and a second chamber 92, and has a restrictor passage 94 formed therein in order to permit a restricted flow of the fluid between the first and second chambers 90, 92. The piston 88 has a protrusion formed at its one end opposite to the valve member 84, such that the protrusion may extend through the communication hole 82 for abutting contact with the valve member 84. The first chamber 90 communicates with the pump passage 44 thorugh a port 96, and the valve chamber 70 communicates with the third passage 30 through a port 98.

When the pressurized brake fluid is fed from the pump 42 to the selector valve 22 through the pump passage 44, the brake fluid is forced to flow through the restrictor passage 94 in the piston 88 from the first chamber 90 to the second chamber 92. At this time, the restriction of the fluid flow through the restrictor passage 94 causes a pressure differential between the first and second chambers 90, 92. This pressure differential causes the piston 88 to move toward the second chamber 92, thereby moving the valve member 84 away from the second valve seat 80 against a biasing force of the spring 86, with a result of forcing the valve member 84 into contact with the first valve seat 78. When the fluid flow through the restrictor passage 94 ceases, the pressure differential between the first and second chambers 90, 92 becomes absent. In this condition, however, the valve member 84 is held seated on the first valve seat 78 with a fluid pressure within the valve chamber 70. Therefore, the second passage 28 which is a part of the primary passage is held in the closed condition, whereby the pressurized fluid from the pump passage 44 is blocked from flowing toward the master cylinder 10. Thus, the selector valve 22 serves as a shut-off valve for blocking a flow of the fluid from the pump 44 toward the master cylinder 10.

The reservoir 40 has a housing 110 in which is received a piston 112 in a slidable and fluid-tight manner. The piston 112 is axially movable within a predetermined range of distance to define a variable-volume storage chamber 114 in cooperation with the housing 110. The piston 112 is biased by a spring 116 in a direction that causes the storage chamber 114 to be diminished.

The relief valve 50 has a housing 120 which has a valve chamber 122 accommodating a spherical valve member 124. The valve chamber 122 communicates with the accumulator 48 via a first port 121, and with the master cylinder 10 via a second port 123. A piston 126 is slidably received in the housing 120 in a fluid-tight manner. The piston 126 is biased by a spring 128 toward the valve member 124, so that the valve member 124 is normally held seated on a valve seat 130, thereby closing the by-pass passage 46. Stated more specifically, the piston 126 is disposed such that its axis is aligned with and opposite to the valve seat 130, with the valve member 124 disposed therebetween. The valve seat 130 defines a part of the valve chamber 122 adjacent to the first port 121. The pressure in the valve chamber 122 acts on one end of the piston 126 in a direction toward the spring 128, namely, acts to move the piston 126 against a biasing force of the spring 128. The other end of the piston 126 receives an atmospheric pressure. The area of the pressure receiving end face of the piston 126 on the side of the valve chamber 122 is selected to be substantially equal to the area of the valve member 124 which receives the pressure when the valve member 124 is seated on the valve seat 130. Accordingly, the piston 126 is subject to a force which is equal to a force with which the valve member 124 is pressed against the valve seat 130 by the pressure in the valve chamber 122. However, the equal forces which act on the piston 126 and the valve member 124 are in the opposite directions. In other words, the force with which the valve member 124 is forced against the valve seat 130 is held constant, irrespective of a variation in the pressure in the valve chamber 122, whereby the relief valve 50 is opened to allow the brake fluid in the by-pass passage 46 to flow back to the master cylinder 10 when the pressure level in the by-pass passage 46 has exceeded a given upper limit.

The check valve 20 and the accumulator 48 are accommodated in a single common housing 140. In this connection, it is noted that, like the housings 74, 110 and 120 of the previously described elements, the housing 140 is formed from plural pieces for easy machining, which are assembled into an integral housing body. The housing 140 is formed with a valve chamber 142 in which is disposed a valve member 144 biased by a spring 146 against a valve seat 148. The housing 140 has a partition wall 141 in which is formed a passage 150.

The passage 150 communicates with the previously indicated second passage 28, and is open in a central portion of the valve seat 148. The valve chamber 142 communicates with the first passage 26 via a port 152 which is open in the valve chamber 142.

The housing 140 is formed with another chamber which is concentric with the valve chamber 142. A piston 154 is slidably and fluid-tightly received in this another chamber, and is biased by a spring 156 toward the valve chamber 142. The piston 154 cooperates with the housing 140 to define a storage chamber 158 whose volume is variable.

In the partition wall 141, there is formed a hole 159 so as to extend between the storage chamber 158 and the passage 150. A rod 160 extends through the hole 159 in a fluid-tight and slidable manner. The rod 160 is adapted to abut at its one end on the piston 154, and at the other end on the valve member 144. The length of this rod 160 is determined so that the rod 160 keeps the valve member 144 away from the valve seat 148 by a slight distance when the piston 154 is located at its fully advanced position at which the piston 154 abuts on a shoulder face 162 of the housing 140. The diameter of the rod 160 and the biasing force of the spring 146 acting on the valve member 144 are selected so that, while a pressure is absent in the storage chamber 158, the piston 154 is not retracted away from its fully advanced position by a pressure in the valve chamber 142, however high the pressure in the valve chamber 142 may be. Further, the diameter of the rod 160 and the biasing force of the spring 146 are selected so that, once the piston 154 has been retracted more than a given distance away from the shoulder face 162 by the pressure in the storage chamber 158, the spring 146 is able to move the rod 160 back to its fully retracted position (toward the storage chamber 158), allowing the valve member 144 to be seated on the valve seat 148, irrespective of the pressures acting on the opposite pressure receiving end faces of the rod 160. As is apparent from the foregoing description, the rod 160 serves as a valve-control mechanism or controlling the check valve 20.

In the thus constructed hydraulic anti-skid braking device or system, the check valve 20 is normally open, and the selector valve 22 holds the second and third passages 28, 30 in fluid communication with each other, while the solenoid valve 24 holds the third and fourth passages 30, 32 in fluid communication with each other. In this normal condition, the pump 42 is held off, and the pistons 112 and 154 in the reservoir 40 and accumulator 48 are held in their fully advanced position, with the storage chambers 114 and 158 having a minimum volume.

Upon depression of the brake pedal 14 in this condition, the pressurized brake fluid is delivered from the master cylinder 10 to the wheel brake cylinders 18 through the first passage 26, check valve 20, second passage 28, selector valve 22, third passage 30, solenoid valve 24 and fourth passage 32. As a result, a brake is applied to the rear wheels 16, whereby the vehicle speed is reduced. As long as the amount of depression of the brake pedal 14 is held relatively small in relation to the coefficient of friction of the road surface, the rear wheels 16 will not undergo such a slip on the road surface that will cause a trouble. Therefore, the controller 60 will not change the operating position of the solenoid valve 24. Namely, an anti-skid function of the braking system is not performed. In this condition, the check valve 20 will not be closed, however high pressure may be applied to the valve chamber 142, because the diameter of the rod 160 and the biasing force of the spring 146 are determined as previously described.

When the amount of depression of the brake pedal 14 is relatively large in relation to the coefficient of friction of the road surafce, the rear wheels 16 will slip on the road surafce in an amount beyond a permissible upper limit. This excessive amount of slip of the rear wheel 16 is detected by the controller 60 by means of the speed sensors 60, and the controller 60 commands the solenoid valve 24 to change its operating position, i.e., the solenoid valve 24 is switched from its PRESSURE RISE position to its PRESSURE HOLD or PRESSURE DROP position. Further, the controller 60 turns on the pump motor 66.

With the solenoid valve 24 switched into its PRESSURE DROP position, the brake fluid is discharged from the brake cylinders 18 to the reservor 40, and thus the pressure in the brake cylinders 18 is reduced. The brake fluid stored in the reservoir 40 is pumped by the pump 42 and fed to the selector valve 22. Then, the instant braking system is operated in different manners, depending upon the level of pressure in the valve chamber 70 of the selector valve 22.

In the case where the pressure in the valve chamber 70, i.e., the pressure in the master cylinder 10 is lower than that in the pump passage 44, the valve member 84 is moved away from the valve seat 80, thereby allowing the brake fluid to flow through the restrictor passage 94 from the first chamber 90 toward the second chamber 92. As a result, the piston 88 is moved toward the second chamber 92 due to a presure differential between the first and second chambers 90, 92, whereby the piston 88 forces the valve member 84 against the valve seat 78. Consequently, the brake fluid fed by the pump 42 is blocked from flowing toward the master cylinder 10 via the second passage 28. In the meantime, the pump passage 44 is brought into communication with the third passage 30. Since this third passage 30 is closed by the solenoid valve 24, the brake fluid will not flow into the third passage 30. Accordingly, the fluid flow through the restrictor passage 94 stops in due course, and a thrust force to move the piston 88 toward the valve chamber 70 will be lost. In this condition, however, the valve member 84 is held seated on the valve seat 78 by the pressure in the valve chamber 70.

Since the pressurized fluid pumped by the pump 42 will not be permitted to flow toward either the master cylinder 10 or the brake cylinders 18, as described above, the fluid from the pump 42 is forced into the by-pass passage 46. In this condition, however, the by-pass passage 46 is closed by the relief valve 50, and therefore the fluid in the by-pass passage 46 forces the piston 154 of the accumulator 48 against the biasing force of the spring 156. Thus, the fluid from the pump 42 is stored in the storage chamber 158 in the accumulator 48. As a result, the valve member 144 of the check valve 20 is seated on the valve seat 148, thereby inhibiting subsequent application of the pressure in the master cylinder 10 to the selector valve 22, even if the master cylinder pressure is increased. Hence, the valve member 84 of the selector valve 22 will not be moved away from the valve seat 78 even after the pressure in the pump passage 44 becomes lower than the pressure in the valve chamber 70.

On the other hand, if the pressure in the valve chamber 70 is higher than that in the pump passage 44 at the time when the pump 42 is turned on to feed the fluid toward the selector valve 22, the valve member 84 of the selector valve 22 is kept seated on the valve seat 80 even after the pump 42 has been started. Therefore, the pressurized fluid from the pump 42 is forced into the accumulator 48 and stored in the storage chamber 158, with result of the valve member 144 of the check valve 20 being seated on the valve seat 148. Thus, the pressure in the master cylinder 10 will not be applied to the selector valve 22. In this condition, the solenoid valve 24 is switched to its PRESSURE RISE position, and the fluid in the accumulator 48 is fed into the brake cylinders 18 through the selector valve 22. More specifically, the piston 88 of the selector valve 22 is moved toward the valve chamber 70 due to a pressure differential between the first and second chambers 90, 92, and the valve member 84 is moved against the valve seat 78. Thus, the selector valve 22 is switched to its upper position (in the FIGURE) only after the solenoid valve 24 has been switched to its PRESSURE RISE position after the check valve 20 is closed.

As described hitherto, the anti-skid operation of the instant hydraulic braking system is achieved in the two different manners, depending upon the level of pressure in the valve chamber 70, i.e., in the master cylinder 10 at the moment when the anti-skid control function is started. In either case, the primary passage (26, 28, 30, 32) is closed by at least one of the check valve 20 and the selector valve 22 after the anti-skid control is brought into effect. This arrangement prevents a kick-back phenomenon of the brake pedal 14 otherwise caused by a flow of the brake fluid from the pump 42 toward the master cylinder 10. The solenoid valve 24 is controlled by the controller 60 so as to keep the pressure in the brake cylinders 18 within a suitable range in which the slip of the rear wheels 16 is held below a permissible upper limit.

In the event that the coefficient of friction of the road surface is increased during the anti-skid control operation and the amount of slip of the rear wheels 16 is reduced, it becomes necessary to feed the brake fluid from the master cylinder 10 to the brake cylinders 18, because the amount of the brake fluid in the reservoir 40 and the accumulator 48 to be fed to the brake cylinders 18 is not sufficient to increase the braking force. In this event, the piston 154 of the accumulator 48 is moved to its fully advanced position and the check valve 20 is opened, whereby the pressurized brake fluid from the master cylinder 10 may be supplied to the brake cylinders 18.

When the vehicle speed has been reduced to a desired level and the foot pressure on the brake pedal 14 is released, the brake fluid in the brake cylinders 18 is returned to the master cylinder 10 through the by-pass passage 34 and via the check valve 36, irrespective of the operating conditions of the solenoid valve 24 and other valves. Thus, the pressure in the brake cylinders 18 is rapidly reduced. As soon as the brake pedal 14 has been returned to its original position, the controller 60 causes the solenoid valve 24 to be returned to its normal PRESSURE RISE position, in response to a signal generated from a detector switch (not shown) for detecting the original position of the brake pedal 14. Accordingly, the brake fluid in the accumulator 48 is returned to the master cylinder 10 via the selector valve 22, solenoid valve 24 and by-pass passage 34, and the check valve 20 is opened with the piston 154 moved to its fully advanced position. The brake fluid in the reservoir 40 is pumped by the pump 42, and returned to the master cylinder 10 via the selector valve 22, solenoid valve 24, by-pass passage 34, etc. Eventually, the valve member 84 of the selector valve 22 is seated on the valve seat 80, and the first, second, third and fourth passages 25, 28, 30, 32 of the primary passage are held in mutually communicating condition. In this condition, no brake fluid is left in the brake cylinders 18, and therefore otherwise possible brake drag is prevented.

If, for example, the brake fluid remains in the reservoir 40 due to a leakage trouble with the solenoid valve 24 during repeated brake applications with a braking pressure not so high as to trigger the anti-skid control, the brake fluid remaining in the reservoir 40 is fed by the pump 42 to the accumulator 48 when the anti-skid control function is effected next. In this instance, the piston 154 of the accumulator 48 is moved to its fully retracted position at which the volume of the fluid in the storage chamber 158 is maximum. That is, the storage chamber 158 becomes unable to accommodate the fluid any more, and therefore the pressure in the pump passage 44 and by-pass passage 46 becomes higher than usual. If this pressure in the passages 44, 46 rises above a preset level of the relief valve 50, the relief valve 50 is opened, allowing the brake fluid to return to the master cylinder 10. In this event, the brake pedal 14 undergoes a kick-back motion, but such an abnormal condition might happen very rarely. In this connection, it is noted that the relief valve 50 is open at a desired preset level, irrespective of the pressure in the master cylinder 10. Hence, it is possible that the preset level of the relief valve 50 be only slightly higher than that of the accumulator 48, to prevent the pressure in the pump passage 44 from becoming excessively high, and to minimize the kick-back phenomenon of the brake pedal 14.

While the present invention has been described in detail in its preferred embodiment for illustrative purpose only, it is to be understood that the invention is not confined to the foregoing disclosure, but may be otherwise embodied. For example, the accumulator 48 may be replaced by an accumulator which employs a high-pressure gas as means for biasing its piston. Further, the accumulator 48 may use other types of a valve-control mechanism or linkage for closing and opening the check valve 20, in place of the rod 160 which abuts at its opposite ends on the piston 154 and the valve member 144. For example, the simple rod 160 may be replaced by a linkage which imparts movements of the piston 154 to the valve member 144 with enlargement of the movement distance. Further, it is not essential that the accumulator 48 and the check valve 20 be accommodated in a single common housing, provided these two units 48, 20 are disposed adjacent to each other.

While the selector valve 22 is used as a shut-off valve for the master cylinder 10, this selector valve 22 may be replaced by a simple check valve which allows the brake fluid to flow only in a direction from the master cylinder toward the brake cylinders. Further, the solenoid valve 24 may be replaced by a combination of two solenoid valves, or may have only two operating positions, i.e., a position for allowing the braking pressure to rise, and another position for allowing the braking pressure to be lowered, but without a position for holding the current braking pressure.

It will be obvious that the present invention may be embodied with various other changes, modifications and improvements that may occur to those skilled in the art, in view of the foregoing teaching, without departing from the scope of the invention defined in the appended claims.

What is claimed is:

1. A hydraulic braking system with anti-skid pressure control means for applying a brake to a drive wheel of an automotive vehicle, having (a) a master cylinder for generating a fluid pressure in response to an operation of a manually-operated member, (b) a brake having a brake cylinder actuated by the fluid pressure generated by the master cylinder, for restraining the rotation of a drive wheel of the vehicle, (c) a primary fluid passage connecting the master cylinder and the brake cylinder to feed a brake fluid from the master cylinder to the brake cylinder, (d) a solenoid valve disposed in the primary fluid passage and selectively placed in one of a first operating position for communication of the brake cylinder with the master cylinder, and a second operating position for communication of the brake cylinder with a reservoir, the solenoid valve being switched between the first and second operating positions under the control of a controller, to control a level of a braking pressure in the brake cylinder for preventing an excessive amount of slip of the drive wheel, (e) a pump for pumping the brake fluid from the reservoir and returning the pumped fluid via a pump passage to the primary fluid passage at a point thereof between the master cylinder and the solenoid valve, (f) a shut-off valve disposed in a portion of the primary fluid passage between the master cylinder and said point, the shut-off valve being closed to prevent a flow of the brake fluid therethrough in a direction from the pump toward the master cylinder when the pressure on one side of the shut-off valve on the side of the pump is higher than that on the other side on the side of the master cylinder, and (g) an accumulator disposed in a fluid passage connecting the pump and the solenoid valve, the accumulator having an accumulator housing, an accumulator piston slidably received in the accumulator housing, and biasing means for biasing the accumulator piston in one axial direction thereof, the accumulator piston co-operating with the accumulator housing to define a storage chamber of a variable volume in which the brake fluid is stored under a relatively high pressure, wherein the improvement comprises:

a check valve disposed in a portion of said primary fluid passage between said master cylinder and said shut-off valve, and adjacent to said accumulator, said check valve inhibiting a flow of the brake fluid therethrough in a first direction from said master cylinder toward said shut-off valve and allowing a flow of the brake fluid therethrough in a second direction opposite to said first direction, said check valve including a check valve seat and a check valve member adapted to be seated on said check valve seat; and a valve-control mechanism disposed between said accumulator and said check valve for controlling said check valve, said valve-control mechanism holding said check valve member away from said check valve seat to allow the brake fluid to flow in said first direction while said accumulator piston is placed in its fully advanced position in which the volume of said storage chamber is minimum, said valve-control mechanism permitting said check valve member to be seated on said check valve seat after said accumulator piston has been retracted a small distance away from the fully advanced position.

2. A hydraulic braking system of claim 1, wherein said valve-control mechanism comprises a rod which is supported by said accumulator housing movably in a direction of movement of said accumulator piston, and in fluid-tight relation with said accumulator housing, said rod being abuttable at one end thereof on said accumulator piston, and at the other end on said check valve member.

3. A hydraulic braking system of claim 2, wherein said accumulator and said check valve are provided in a single common housing having a partition wall which separates said storage chamber of the accumulator from a valve chamber in which said check valve member is accommodated, said rod extending through said partition wall.

4. A hydraulic braking system of claim 1, wherein said shut-off valve is a selector valve which normally holds said master cylinder in communication with said solenoid valve, but not in communcation with said pump, said selector valve bringing said pump into communication with said solenoid valve and disconnecting said master cylinder from said pump and said solenoid valve when said pump is actuated.

5. A hydraulic braking system of claim 1, wherein said shut-off valve comprises:
 means for defining a shut-off valve chamber formed at a connection of said pump passage and said primary fluid passage;
 a shut-off valve seat which partially defines said shut-off valve chamber, and through which the brake fluid from said master cylinder is fed into said shut-off valve chamber;
 a shut-off valve member accommodated in said shut-off valve chamber such that the shut-off valve member may be seated on and moved away from said shut-off valve seat;
 biasing means for biasing said shut-off valve member in a direction away from said shut-off valve seat;
 means for defining a shut-off piston chamber constituting a part of said pump passage;
 a shut-off valve piston slidably received in said shut-off piston chamber so as to define a first and a second pressure chamber on opposite axial ends thereof, said first pressure chamber being connected to said pump passage while said second pressure chamber being open in said shut-off valve chamber, said shut-off valve piston normally permitting said shut-off valve member to be placed away from said shut-off valve seat, and
 means for defining a restrictor passage communicating with said first and second pressure chambers, said restrictor passage allowing the brake fluid to flow from said first pressure chamber to said second pressure chamber when said pump is actuated to feed the brake fluid to said first pressure chamber, said restrictor passage giving a restriction to a flow of the fluid therethrough toward said second pressure chamber and thereby generating a pressure differential between said first and second pressure chambers, said pressure differential causing said shut-off valve piston to move toward said second pressure chamber and thereby seat said shut-off valve member on said shut-off valve seat.

6. A hydraulic braking system of claim 5, wherein said restrictor passage is formed through said shut-off valve piston.

7. A shut-off valve in an anti-skid pressure control device of a hydraulic braking system for an automotive vehicle, the anti-skid pressure control device including a solenoid valve disposed in a primary fluid passage of the braking system which connects a master cylinder and a brake cylinder to feed a brake fluid from the master cylinder to the brake cylinder to apply a brake to a drive wheel of the vehicle, said solenoid valve being selectively placed in one of a first position for communication of the brake cylinder with the master cylinder, and a second position for communication of the brake cylinder with a reservoir, the solenoid valve being switched between said first and second positions under the control of a controller to control a level of a braking pressure in the brake cylinder for preventing an excessive amount of slip of the drive wheel, the anti-skid pressure control device further including a pump for pumping the brake fluid from the reservoir and returning the pumped fluid via a pump passage to a portion of the primary fluid passage between the master cylinder and the solenoid valve, wherein
 said shut-off valve is disposed at a connection of said pump passage and said primary fluid passage, said shut-off valve normally maintaining fluid communication between portions of said primary fluid passage on both sides of said connection, said shut-off valve being closed to prevent a flow of the brake fluid therethrough in a direction from said pump toward said master cylinder while the brake fluid is fed via said pump passage to said shut-off valve, said shut-off valve comprising;
 means for defining a shut-off valve chamber formed at a connection of said pump passage and said primary fluid passage;
 a shut-off valve seat which partially defines said shut-off valve chamber, and through which the brake fluid from said master cylinder is fed into said shut-off valve chamber;
 a shut-off valve member accommodated in said shut-off valve chamber such that the shut-off valve member may be seated on and moved away from said shut-off valve seat;
 biasing means for biasing said shut-off valve member in a direction away from said shut-off valve seat;
 means for defining a shut-off piston chamber constituting a part of said pump passage;
 a shut-off valve piston slidably received in said shut-off piston chamber so as to define a first and a second pressure chamber on opposite axial ends thereof, said first pressure chamber being connected to said pump passage while said second pressure chamber being open in said shut-off valve chamber, said shut-off valve piston normally permitting said shut-off valve member to be placed away from said shut-off valve seat, and
 means for defining a restrictor passage communicating with said first and second pressure chambers, said restrictor passage allowing the brake fluid to flow from said first pressure chamber to said second pressure chamber when said pump is actuated to feed the brake fluid to said first pressure chamber, said restrictor passage giving a restriction to a flow of the fluid therethrough toward said second pressure chamber and thereby generating a pressure differential between said first and second pressure chambers, said pressure differential causing said shut-off valve piston to move toward said second pressure chamber and thereby seat said shut-off valve member on said shut-off valve seat.

* * * * *

UNITED STATES PATENT AND TRADEMARK OFFICE
CERTIFICATE OF CORRECTION

PATENT NO. : 4,618,189
DATED : October 21, 1986
INVENTOR(S) : N. Nakanishi, et al.

It is certified that error appears in the above-identified patent and that said Letters Patent is hereby corrected as shown below:

Column 3, line 48, change "accumular" to --accumulator--.

Column 3, line 55, change "accumular" to --accumulator--.

Column 4, line 17, change "heighest" to --highest--.

Column 4, line 20, insert --to-- between "respect" and "the".

Column 5, line 10, change "being" to --is--.

Column 5, line 49, change "occassions" to --occasions--.

Column 6, line 19, after "connected" insert --to--.

Column 7, line 12, change "20" to --10--.

Column 7, line 65, change "surace" to --surface--.

Column 8, line 55, change "thorugh" to --through--.

Column 10, line 9, change "another" to --other--.

UNITED STATES PATENT AND TRADEMARK OFFICE
CERTIFICATE OF CORRECTION

PATENT NO. : 4,618,189
DATED : October 21, 1986
INVENTOR(S) : N. Nakanishi, et al.

Page 2 of 2

It is certified that error appears in the above-identified patent and that said Letters Patent is hereby corrected as shown below:

Column 11, line 6, change "surafce" to --surface--.

Column 11, line 7, change "surafce" to --surface--.

Column 11, line 32, change "presure" to --pressure--.

Column 15, line 46, change "being" to --is--.

Column 16, line 50, change "being" to --is--.

Signed and Sealed this

Twenty-eighth Day of April, 1987

*Attest:*

DONALD J. QUIGG

*Attesting Officer*   *Commissioner of Patents and Trademarks*